Nov. 30, 1926. Re. 16,492
F. V. SCOTT
BEAN HARVESTER
Original Filed Jan. 2, 1920
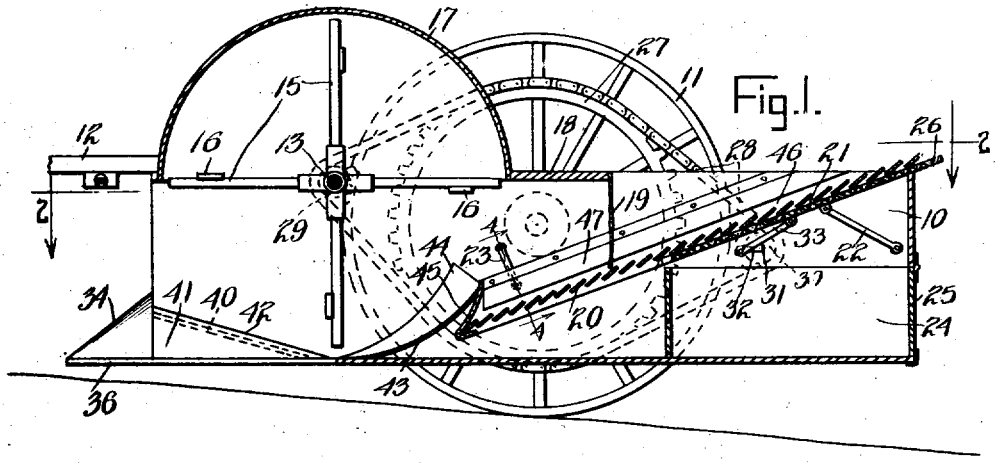
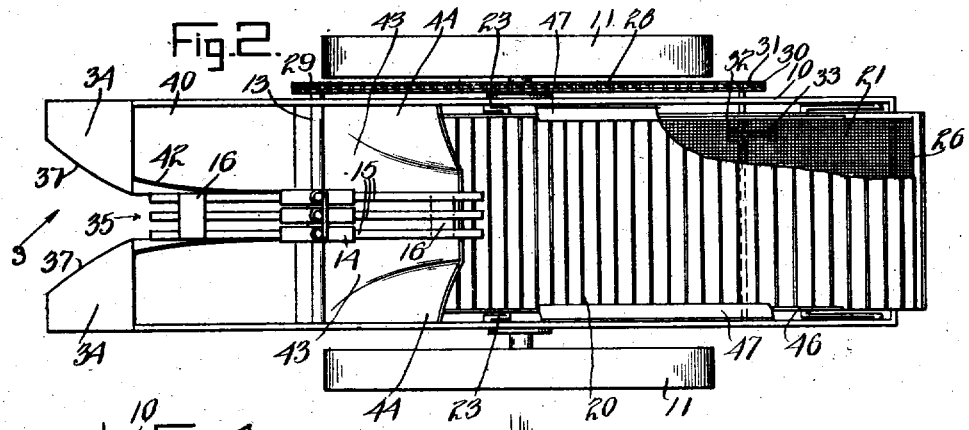
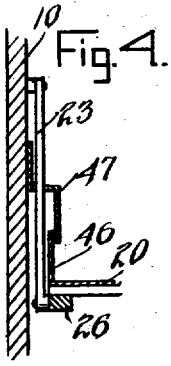
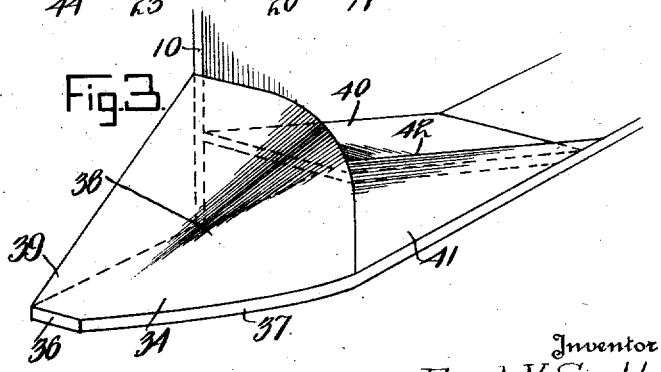
Inventor
Frank V. Scott
By
Attorney Reissued Nov. 30, 1926. Re. 16,492

UNITED STATES PATENT OFFICE.

FRANK V. SCOTT, OF ELIZABETH CITY, NORTH CAROLINA.

BEAN HARVESTER.

Original No. 1,429,168, dated September 12, 1922, Serial No. 348,728, filed January 2, 1920. Application for reissue filed July 3, 1924. Serial No. 724,127.

This invention relates to bean harvesters, and has for an object to provide a device embodying new and improved elements, units, features, and combinations of utility, reliability and economy of operation.

Referring to the accompanying drawing, which is made a part hereof, and on which similar reference characters indicate similar parts, Figure 1 is a view of the device in longitudinal vertical section, Figure 2 is a view in horizontal section taken on line 2—2 of Figure 1, Figure 3 is a detail enlarged perspective view of one of the guides as indicated by arrow 3 on Figure 2, and Figure 4 is a sectional view taken on line 4—4 of Figure 1.

The improved bean harvester, which forms the subject matter of this application, comprises a body or housing 10 mounted upon traction wheels 11, with means for applying draft thereto indicated at 12.

Within the housing 10, a shaft 13 is journaled carrying a beater preferably made up of a plurality of units, each comprising a hub 14, with a plurality of arms 15, extending radially therefrom here shown as four in number, it being understood however that the number comprehended within the present invention is not limited in such manner. Several beater units, if used specifically as shown, are organized into a single beater by being mounted upon the said shaft. In the drawing three of the units are shown joined together with cleats 16. It is obvious that any number of such units may be employed as may be found necessary or convenient. The shaft 13 is journaled near the top of the housing 10 and an arcuate hood is erected over that portion of the beater extending above the housing. At the rear of the hood 17 a deck 18 is provided, having secured to the rearward edge thereof, a downwardly extending apron 19 unattached at its lower edge.

Beneath the apron 19 a combination screen agitator and conveyor is mounted, comprising an agitator section 20 and screen section 21. The agitator and screen are preferably mounted in the same frame and the same plane, although the exact features of mountings are immaterial to the present invention. Also the unitary structure is mounted to oscillate in any approved manner as by pivoting upon links 22 and 23. The agitator section 20 and screen section 21, as will be noted, are the stepped or saw-toothed construction whereby the material dumped thereon from the beater is agitated and moved upwardly and rearwardly as the unit is oscillated until the material is passed to the screen portion 21, whereupon the beans, threshed and dislodged from the cases, stalks and stems, will fall through into the bin 24 adapted to discharge the contents in any approved manner as by the manipulation of the door 25. The upper and rearward end of the agitator-conveyor screen unit extends rearwardly over the body 10 as at 26, so that the stalks, stems and other extraneous matter is dumped from the rear end of the body onto the ground.

For the purpose of driving the beater and oscillating the agitator-screen, power is taken from one or both of the traction wheels 11 in any approved manner. As here shown a sprocket collar 27 is secured to the spokes of one of the wheels and carries a sprocket chain 28 passing about a sprocket 29 upon the shaft 13 and about a sprocket 30 upon a shaft 31. The shaft 31 is journaled to rotate in the housing 10 and is provided with an offset crank portion 32 connecting with the link 33, whereby when the shaft 31 is driven, the agitator-screen unit will be oscillated upon the links 22 and 23.

To guide the standing stalks into position to be acted upon by the beater, guides 34 are employed spaced apart by an interval indicated at 35, so that the standing stalks are by the guides 34 introduced into the interval 35 into position to be acted upon by the beater. The guides 34 are of new and novel shape, having their lower planes 36 substantially horizontal but their proximate edges curved as indicated at 37. Above this base a curved member 38 is employed having a substantially plane portion 39 (see Figure 3), the remaining portion of said member being conoidal. At the rear of the member 38, a plate 40 is provided with a V-shaped plate 41 extending above the plate 40 and curved to correspond to the curvature of the member 38, with an edge 42 extending above the plate 40. It will be noted especially from Figures 2 and 3 that this edge 42 is rolled inwardly and tapered above the plate 40. At the rear of the plate 40 a guide 43 is provided having its edges turned upwardly as indicated at 44. Between the upturned edges 44 and the rolled edges 42 a trough-like space is provided for the rotation of the beater, so that the materials, dislodged by the beater when thrown upon the bottom of the housing, will be thrown against either the plates 40 or 43 and by the rotation of the beater, either through interposition of material moved thereby or by air currents created by such rotation, will be thrown rearwardly against the apron 19 and dropped upon the conveyor portion 20 of the conveyor-screen.

The apron 19 performs not only the function of limiting the trajectory of the material from the beater, but also by bearing upon the top of the material upon the agitator-screen surface to hold the material in more intimate relation with such unit and by maintaining the material in a mass or sheet to facilitate the movement of the entire mass somewhat as a unit along the surface of the agitator-screen impelled by the action of the beater in the rear and the stepped slats extending across the unit.

To prevent the material acted upon from falling between the plate 43 and the agitator 20, a flexible section 45 composed of fabric or the like is attached to the rear of the plate 44 and to the lower edge of the agitator as indicated more particularly at Figure 1.

Also to prevent the material from passing over the edges of the agitator-screen unit, such unit is provided upon opposite edges with an upstanding flange 46 and a shield 47 is attached to the inner surface of the housing 10 and extends over the flange 46 forming a slip joint between such members permitting the oscillation and reciprocation of the agitator-screen unit.

It is obvious that in operation as the device is driven along a row of standing peas, beans or the like with the traction wheels 11 spaced substantially equally distant upon opposite sides of the row, the standing plants will be guided by the guides 34 into the opening 35 where they will be violently beaten by the beater which in its rotation will tear and cut the stalks and stems, carrying such severed stalks and stems with it in its rotation, and at the same time by concussion, opening the pods, discharging the beans or peas therefrom. The beans or peas when discharged from the pods, in their ripened state or when in condition for harvesting, nevertheless, still are commingled with the pods. The stalks and the stems will be thrown upon the agitator-section 20 which will agitate the commingled mass, which is held evenly but yieldingly by the apron 19 and by reason of the shape and greater specific gravity of the peas or beans, will cause the said peas or beans to seek the lower level in engagement with the conveyor while the stalks and stems and lighter materials will occupy a position above. In this relation the materials are forced on to the screen portion by the pressure behind, the agitation and the force of the unit, and the peas or beans promptly discharged through such screen into the bin 24. The continual addition of material from the agitator 20 to the screen will cause the material thereon to be moved upwardly and rearwardly and after sufficient agitation, to discharge through the screen all of the beans or peas, will dump the stalks, stems and the like over the rear end of the screen at 26 on to the ground.

Especial emphasis is placed on the formation of the bottom of the forward end of the body comprising the plates 40 and 43 with the upturned flanges 42 and 44. These members form a trough-like passage through the forward end of the body tending to continually move any contained material into the path of action of the beater to complete the opening of any unopened pods to discharge the beans or peas and also to bring the material in such position that the rotation of the agitator will engage against the material and throw it rearwardly upon the agitator section 20 against the apron 19. As has been pointed out, the apron 19 performs the function of limiting the movement of the material thrown from the beater so that it is not thrown over the rear end of the body, but it also performs another and perhaps even more important function in that it holds the material yieldingly upon the agitator and screen section whereby it is subjected more thoroughly to the agitation and is advanced to the discharge end of the screen section by the continued agitation and the saw-tooth formation of the unit.

It will be understood, of course, that the details of construction and arrangement may be modified or varied by those skilled in the art without materially modifying the purpose or operation of the invention. I do not therefore desire to be understood as limiting the scope of my invention except as may be required by the terms of the claims.

Having thus fully described my said invention, what I claim as new and desire to secure by Letters Patent, is:

1. A bean harvester comprising a body having a centrally disposed longitudinal opening in its bottom, traction wheels supporting the body, a beater journaled within the body positioned to operate adjacent the longitudinal opening, an agitator-screen mounted within the body and adapted to maintain therewith an inclination, means for driving the beater and oscillating the agitator-screen comprising a sprocket on a traction wheel, sprockets on the shafts of the beater and the agitator-screen and a chain engaging all the sprockets, and means to guide material from the beater on to the agitator.

2. A bean harvester comprising a body having a central longitudinal opening in its forward end, traction wheels supporting the body, a beater journaled to rotate within the body adjacent the longitudinal opening, an agitator-screen mounted to maintain an inclination with the horizontal and adapted to oscillate adjacent the beater, means to simultaneously actuate the beater and agitator-screen, comprising a traction wheel carrying a driving element, a shaft connected to the agitator screen carrying a driven element, a driven element on the shaft of the beater, flexible means connecting the driving element and the two driven elements to drive the latter, and guides formed at the forward end of the body adjacent the longitudinal opening and provided with conoidal shaped upper surfaces.

3. A bean harvester comprising a body having a central longitudinal opening in the bottom at the forward end, wheels supporting the body, a beater mounted to rotate within the body adjacent to the longitudinal opening, a plate disposed at the rear of the beater having its edges turned upwardly to form a trough-like channel for the passage of the beater, a separating element mounted in the rear of the beater and in position to receive material from the plate, and an apron positioned to limit the movement of material upon the separating element.

4. A bean harvester comprising a body having a longitudinally disposed slot in the bottom at the forward end, a beater journaled in the body above the longitudinal slot, an oscillating separator disposed in the rear of the beater and adapted to maintain an inclination to the horizontal, guides formed upon the proximate edges of the slot and having their upper surfaces conoidal-shaped, and plates in the rear of the guides having flanges extending above the plane of the plates.

5. A bean harvester comprising a body having a slot formed in the bottom of the forward end, mechanically operated beating and separating elements disposed within the body in operative relation to the slot, guides formed upon the forward end of the body with the lower edges engaging the proximate edges of the slot and the upper surfaces of the conoidal formation, plates disposed in the rear of the conoidal guides, and guard members forming a continuation of the inner surfaces of the guides with their upper edges rolled inwardly over the plates.

6. In a bean harvester, a body having a portion of its upper surface open, a beating member mounted within the body in position to engage standing plants, a separating member disposed upon an inclined plane in the rear and to receive material from the beating element and with its upper and rearward end extending and adapted to discharge over the rear of the body, means to oscillate the separating member, a housing extending over the beating member, and an apron depending therefrom near the separating member said apron serving to limit the distance to which material can be thrown by the beating member.

7. In a bean harvester a housing, an inclined agitator-conveyor, a beater supported in position to act on plants attached to the ground to discharge material therefrom upon the agitator-conveyor, and an apron positioned to bear upon material upon the agitator-conveyor.

8. In a bean harvester a housing, an agitator-conveyor set at an inclination to the plane of the housing, an apron hung from a support above and extending nearly into engagement with the agitator-conveyor, and a beater positioned to detach material from plants attached to the ground and throw such material upon the agitator-conveyor and into engagement with the apron.

9. In a bean harvester, a housing, an inclined agitator-conveyor, a beater positioned to discharge material upon said agitator-conveyor from vines attached to the ground, and flexible means arranged to bear upon the material upon the agitator-conveyor.

10. A bean harvester comprising a casing, an agitator-conveyor in said casing, a beater also in said casing and positioned to discharge material upon said agitator-conveyor from vines attached to the ground, and means yieldingly supported arranged to bear upon the material carried upon said agitator-conveyor, substantially as set forth.

11. A bean harvester comprising a casing, a beater positioned at the lower end of said casing, an inclined agitator-conveyor positioned behind said beater, means for directing the material from said beater upon said agitator-conveyor, and means yieldingly supported above said agitator-conveyor and adapted to bear upon the material in its passage thereover, substantially as set forth.

12. A bean harvester comprising a body having a pair of supporting wheels, a beater in front of said wheels, an agitator-screen in the rear thereof, a shaft adjacent to the screen for driving it, a sprocket carried by one of the supporting wheels, sprockets carried by the beater shaft and the agitator-screen shaft, respectively, and a single sprocket chain mounted to engage said several sprockets whereby the beater and the agitator-screen are driven by a common driving means connected with the supporting wheels, substantially as set forth.

13. A bean harvester comprising a casing, an agitator-conveyor in said casing, means for imparting to said conveyor a reciprocating movement and separate means for imparting to its rear end a vertical movement, a beater positioned in front of said agitator-conveyor and adapted to throw the bean vines on to said conveyor, means for operating said beater, and an inclined plate extending upwardly toward the front of the machine from a position approximately beneath the axis of the beater, substantially as set forth.

14. A bean harvester comprising a casing, an agitator-conveyor in said casing, a beater also in said casing and positioned to discharge material upon said agitator-conveyor, means for operating said conveyor and said beater, and an inclined plate extending upwardly from a point approximately beneath the axis of the beater toward the front of the machine and another inclined plate extending downwardly to the front of the machine and adapted to guide the material upon said first mentioned inclined plate, substantially as set forth.

15. In a bean harvester, a housing, an inclined conveyor, a beater positioned to thrash standing plants and to discharge material removed from such plants upon said conveyor, and depending flexible means arranged to bear upon the material upon the conveyor to equalize the movement of such material.

16. A bean harvester comprising a casing, a conveyor in said casing, a beater also in said casing and positioned to thrash standing plants so as to discharge material removed therefrom upon said conveyor, and means yieldingly supported arranged to bear upon the material carried upon said conveyor to equalize the movement of such material, substantially as set forth.

17. A bean harvester comprising a casing, a separator-conveyor in said casing, a beater also in said casing and positioned to discharge material upon said separator-conveyor, means for operating said conveyor and said beater, an inclined plate extending upwardly from a point approximately beneath the axis of the beater toward the front of the machine, and another inclined plate extending downwardly to the front of the machine and adapted to guide the material upon said first mentioned inclined plate, substantially as set forth.

18. A bean harvester comprising a frame with a centrally disposed opening through the lower portion of the forward end and the bottom adjacent thereto arranged to receive the vines, means at each side of the opening for directing the vines into the opening, mechanically operated thrashing, conveying, and separating means disposed within the body in operative relation to said opening, and means for yieldingly holding the material removed from said vines in place on the conveyor, substantially as set forth.

19. A harvester for legumes comprising a beater positioned to engage standing plants, means for guiding the standing plants into the path of the beater, a casing over the top of the beater, a conveyor behind the beater toward which the tops of the standing plants are urged by said beater, and a flexible apron hanging down nearly to the conveyor, substantially as set forth.

20. A harvester for legumes comprising a relatively narrow beater, means for guiding the vines of a row into the path of the beater, a casing for guiding the vines into the path of the beater, said casing having a rearward extension, a conveyor behind the beater, and a flexible apron depending from the rear end of said extension nearly to the conveyor, substantially as set forth.

21. A harvester for legumes comprising a beater, means for guiding the standing plants into the path of the beater, a casing over the top of the beater, a conveyor behind the beater, the lower part of said beater moving toward said conveyor, a flexible apron hanging down nearly to the conveyor, and means for shaking the conveyor, substantially as set forth.

22. A harvester for legumes comprising a beater, means for guiding standing plants into the path of the beater, a casing over the top of the beater, an inclined conveyor behind the beater, and means for imparting to the conveyor combined endwise and vertical shaking movements, substantially as set forth.

23. A harvester for legumes comprising a relatively narrow beater, means for guiding the tops of standing plants into the path of the beater, a casing over the top of the beater, an inclined conveyor behind the beater, and means for imparting endwise shaking movements to the conveyor, substantially as set forth.

24. A harvester for legumes comprising a beater, means for guiding the standing vines into the path of the beater, a casing over the top of the beater, an inclined conveyor behind the beater, means for imparting to the conveyor combined endwise and vertical shaking movements, and means bearing yieldingly on the material upon the conveyor, substantially as set forth.

25. A harvester for legumes comprising a beater, means for guiding the standing vines into the path of the beater, a casing over the top of the beater, an inclined conveyor behind the beater, means for imparting endwise shaking movements to the conveyor, and a flexible closure between the vine-guiding means and the front end of said conveyor, substantially as set forth.

26. A harvester for legumes comprising a casing having an opening through the lower portion of its forward end and through its bottom adjacent thereto, a relatively narrow beater revolvably mounted over one of said openings and conforming to the dimensions thereof, means for guiding the vines in a row into the path of the beater, a casing over the top of the beater, means behind the beater for separating the seeds from the vines, and means for shaking the separating means, substantially as set forth.

27. A bean harvester comprising a casing, a separating element in said casing, a beater also in said casing positioned to throw material from a lower to a higher elevation onto said separating element, means for operating said beater, means to move material over said separating element, and means to control the discharge of material from the beater on the separating element, substantially as set forth.

28. In a harvester for legumes, a casing, a relatively narrow thrasher-beater therein, means at the forward end of the casing to guide standing plants into the path of the thrasher-beater, and a conveyor at the rear of the thrasher-beater the bottom walls of the casing sloping laterally toward the beater, substantially as set forth.

In witness whereof, I have hereunto set my hand at Elizabeth City, North Carolina, this 29th day of May, 1924.

FRANK V. SCOTT.